UNITED STATES PATENT OFFICE.

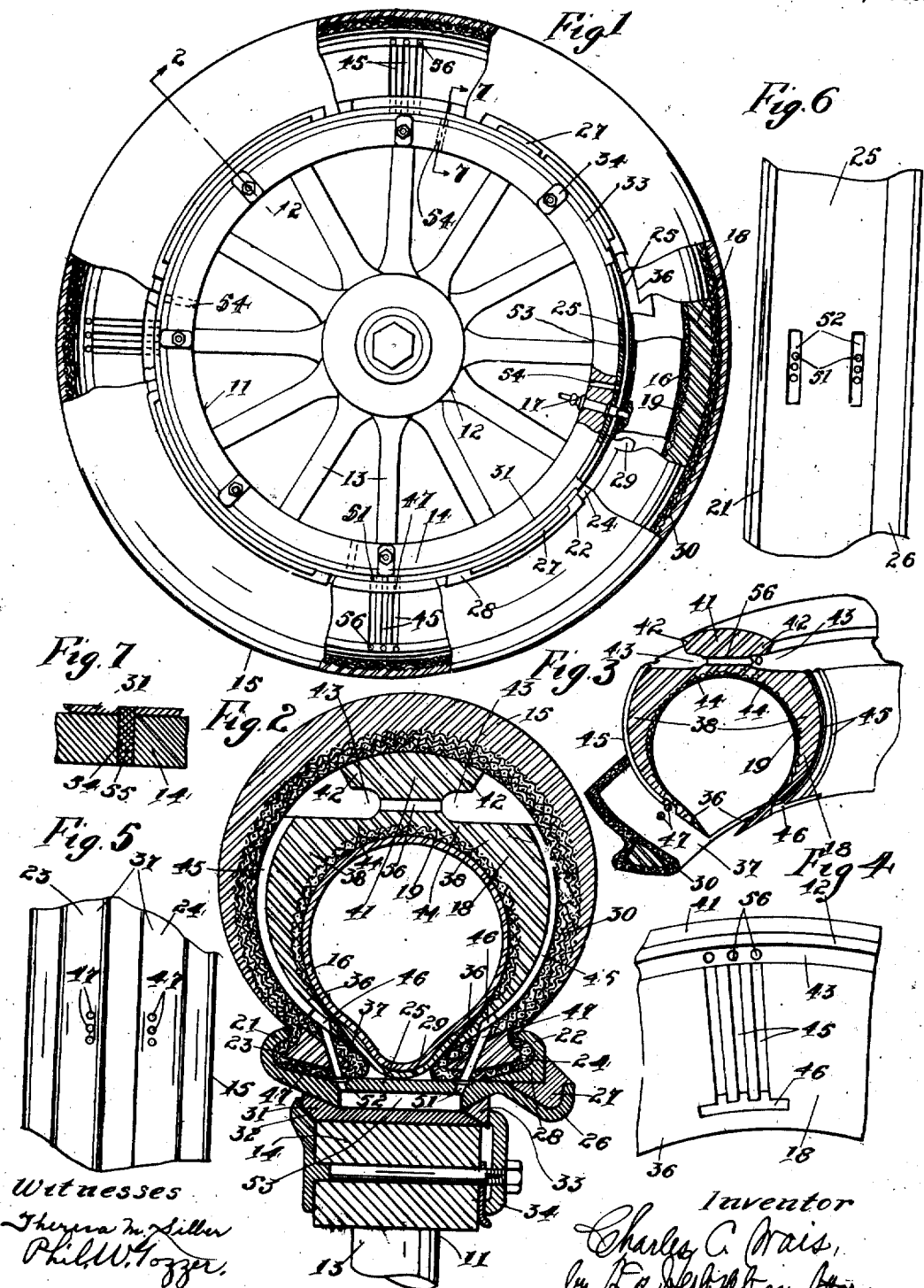

CHARLES C. WAIS, OF CINCINNATI, OHIO.

VEHICLE-WHEEL.

1,253,753.    Specification of Letters Patent.    Patented Jan. 15, 1918.

Application filed November 4, 1915. Serial No. 59,570.

*To all whom it may concern:*

Be it known that I, CHARLES C. WAIS, a citizen of the United States, residing at Cincinnati, in the county of Hamilton and State of Ohio, have invented certain new and useful Improvements in Vehicle-Wheels, of which the following is a specification.

My present invention is an improvement upon the vehicle wheel shown, described and claimed in my application for patent on improvements in vehicle wheels, filed December 24th, 1914, Serial No. 878,968.

It is the object of the present improvement to provide novel armor interposed between the outer casing and the inner pneumatic tube; further to provide novel means whereby cooling air-chambers are formed between the outer casing and the inflatable inner pneumatic tube of the tire, having communication with the outside atmosphere for providing circulation of air in the air-chambers and cooling the tire; and, further to provide means whereby the admission of water and deleterious foreign substances into the air-chambers is prevented.

The invention will be further readily understood from the following description and claims, and from the drawings, in which latter:

Figure 1 is a side elevation of my improved device, partly broken away for better illustration of the parts.

Fig. 2 is a cross-section of the same taken on the line 2—2 of Fig. 1.

Fig. 3 is a detail in perspective, showing the relation of the armor and casing.

Fig. 4 is a detail of a section of the armor in side elevation, showing the air-passages in the armor.

Fig. 5 is a detail of the inner edge of the casing, showing the air-passages therein.

Fig. 6 is a plan detail of a section of the rim; and,

Fig. 7 is a detail showing the air-passage through the felly, taken on the line 7—7 of Fig. 1.

11 represents the body of the vehicle wheel, shown as comprising a hub 12, spokes 13, and a felly 14.

The outer casing or tread-member of the tire is represented at 15, and the inner member or inflatable pneumatic tube of the tire is represented at 16, inflated through a valve 17. Within the casing there is a cushion-member 18, shown interposed between the tread-member and the inner tube of the tire. This cushion-member is of resilient substance, as rubber, and may have an inner lining 19 of fabric embedded therein.

In the present exemplification of my invention the casing is held in place by means of annular flanges 21, 22, which contact with annular bases 23, 24, of the casing. The annular flange 21 extends integrally from an annular rim 25 which is provided with an annular groove 26 in which an annular split-ring 27 is received. The annular flange 22 is on an integral ring 28 which is held about the rim 25 by means of the split-ring 27.

A usual annular apron 29 is received between the bases of the outer casing and the inner tube for protecting the pneumatic tube of the tire. The inner portion of the casing preferably has fabric strips 30 embedded therein.

The rim 25 is suitably attached to the body of the wheel. It is exemplified as a demountable rim, being held in place about an annular felly-rim 31 secured to the felly of the wheel, as by the annular inclined connection 32 at one side thereof and the annular clamp-ring 33 at the other side thereof, the latter clamped in place by clamps 34.

The cushion-member 18 is formed crescent-shaped in cross-section, with the horns 36 of the crescent projecting inwardly toward each other to substantial extent, the inner ends of these horns being supported by the inwardly sloping portions 37 of the outer casing when the parts are assembled, in which relation further the inner ends of these horns extend to substantial extent within the annulus of the inner inflatable pneumatic tube when inflated, and past the points of contact of the annular flanges 21, 22, in the outer casing, so that said inner ends are located to substantial extent between the annular bases 23, 24, of the casing, which extend to substantial extent toward each other, and said inner inflatable pneumatic tube when inflated in lines perpendicular to the axis of rotation of the wheel.

The horns gradually increase in cross-section toward the side portions of the cushion-member 18, as shown at 38. The outer peripheral portion of the armor is formed cross-sectionally to form a substantially T-shaped head comprising a stem 41 and laterally extending wings 42 forming recesses 43 arranged annularly about the armor, the inner walls of said recesses being formed by webs 44 between said stem and horns.

The recesses 43 form channels extending annularly between the horns 36 and the annular outer peripheral or tread portion of the cushion-member. The channels 43 preferably extend laterally in lines substantially parallel to the axis of rotation of the wheel for forming the wings 42.

During use of pneumatic tires, the tires, in practice become heated. I have therefore provided means whereby a cooling agency may be introduced into the tire, which I accomplish by employment of the channels 43 which form substantially annular chambers between the armor and the outer casing of the tire. I provide means whereby a current of cooling agency is passed into and out of said chambers. For accomplishing this I prefer to employ cross-channels 45 which communicate with the channels 43 and preferably pass along the horns 36 in direction toward the axis of rotation of the wheel or arranging their inner ends away from the tread portion of the wheel, that is, toward the location of the securing means on the wheel for the tire, so as to remove the openings at the inner ends of said cross-channels from the tread portion of the tire in order to reduce the liability of undesirable substances being received in said channels.

In my preferred construction the outer faces of the inner portions of the horns 36 are provided with preferably annularly arranged grooves 46 for forming passages for the cooling agency, for instance air, between said horns and the outer casing. The channels 45 communicate with the grooves 46.

The outer casing is provided with an aperture or apertures 47 adjacent to the attaching means thereof, forming passages arranged to communicate with the grooves 46. The grooves may be extended any desired distance annularly about the armor so as to insure registry between said grooves and the passages 47 when the armor is located in the outer casing. The grooves are shown in the armor, although they may, if desired, be located in the inner face of the outer casing.

The passages 47 are arranged to have communication with the outside atmosphere, accomplished preferably in manner to prevent the passing of water, dust or the like, into the cooling passage of the tire. I exemplify the passages 47 as arranged to communicate with holes 51 in the rim 25, grooves 52 being between the passages 47 and holes 51, shown in the outer face of the rim.

There is an annular space 53 between the rims 25 and 31, with which the holes 51 communicate. One or more passages 54 are provided through the rim 31 and the felly 14, four of these passages being shown. These passages are preferably closed by a water and dust-arresting substance, for instance a suitable fiber. A body 55 of the water and dust-arresting substance is shown located in the passage and is arranged to arrest the water, dust and the like, but permits the passage of air.

The channels 43, 43, are connected through the stem of the outer annular head of the armor by means of cross-passages 56, a number of these cross-passages preferably being provided about the circumference of the armor.

In operation the tire will be compressed by the load at the lower or ground-contacting portion of the wheel for contacting the channels 43, whereby the air is pushed outwardly therefrom at points adjacent to the compressed portion. When the compressed portion leaves the ground it will again expand and thereby draw in air, for causing a current of air to pass through the channels and passages, thereby cooling the tire and preventing excessive heating thereof.

My improved device forms a tire which for all practical purposes is puncture proof. The armor further provides means rendering the tire non-collapsible. The horns of the armor extend past the contact-points between the flanges of the tire securing means and the outer casing, and thereby prevent blow-outs, as the armor acts as a support at the inner face of the outer casing which covers the weakened portions of the outer tire and receives the stress of the pressure of the inner tube.

The load pressure of the wheel is directed against the annular T-head of the armor which extends annularly outwardly from the webs between the bases of the horns at either side of the armor. The resilient webs aid in resiliently resisting the load pressures acting upon the T-head, which is of resilient material, for cushioning the tire independent of the inflatable inner pneumatic tube. The load pressures upon the resilient head and the resilient webs further act to resiliently spread the sides of the armor, the inner ends of the horns of the armor resting upon the faces of the outer casing and acting as an inner anchor for the horns.

Having thus fully described my invention, what I claim as new and desire to secure by Letters Patent, is:

1. In a vehicle wheel, the combination of a casing, an inner pneumatic tube, and an armor interposed between said casing and inner pneumatic tube, said armor being substantially crescent-shaped in cross-section with its outer periphery cross-sectionally in the form of a T-head comprising a stem and laterally extending wings forming annularly arranged channels at the respective sides of said head adjacent to the tread-portion of said casing and having cross-channels communicating with said first-named channels having outlet to the atmosphere at the inner portion of said casing.

2. In a vehicle wheel, the combination of a casing, an inner inflatable pneumatic tube, and an annular armor interposed between said casing and inner tube, said armor being substantially crescent-shaped in cross-section formed with lateral horns and an outer peripheral T-head comprising a stem, laterally projecting annularly arranged wings at the outer portion of said stem, and cross-webs between said stem and horns, said wings projecting laterally crosswise of and spaced from said cross-webs.

3. In a vehicle wheel, the combination of a casing, an inner inflatable pneumatic tube, an annular armor between said casing and pneumatic tube, said armor being substantially crescent-shaped in cross-section with its outer periphery cross-sectionally in the form of a T-head comprising a stem and laterally extending wings forming annularly arranged channels at the respective sides of said head adjacent to the tread-portion of said casing, a cross-passage through said T-head connecting said annularly arranged channels, a cross-channel communicating with said annularly arranged channels, said casing provided with a passage communicating with said cross-channel, and a water and dust resisting member through which air communication is had with said last-named passage, constructed and arranged whereby to create circulation in said channels and passages by the load pressures upon said wheel.

4. In a vehicle wheel, the combination of separated annular tire-retaining means, a casing comprising inner inwardly extending portions having annular retaining parts coacting with said tire-retaining means, an inner inflatable pneumatic tube, an armor interposed between said casing and inner tube, said armor being substantially crescent-shaped in cross-section comprising an annularly arranged T-head forming laterally annularly arranged channels at the respective sides of said head, lateral horns having inner inwardly extending ends coacting with said inner portions of said casing, said armor having a passage through said head between said channels, a cross-channel communicating with said channels extending crosswise on said horn, and a passage through said inwardly extending portion of said casing communicating at one of its ends with said cross-channel and communicating at the other of its ends with the atmosphere.

5. In a vehicle wheel, the combination of a casing, an inner inflatable pneumatic tube, an armor interposed between said casing and inner tube, said armor being substantially crescent-shaped in cross-section formed with an annularly arranged T-head forming lateral annularly arranged channels at the respective sides of said head and with lateral horns having inner inwardly extending ends, said armor having a passage across said head between said channels and channels extending crosswise of said armor along said horns, said last-named channels communicating with said first-named channels at one of their ends and with the outside atmosphere at the other of their ends, and arranged whereby to cause air-circulation in said channels and passage by the load pressures upon said wheel.

In testimony whereof, I have hereunto signed my name in the presence of two subscribing witnesses.

CHARLES C. WAIS.

Witnesses:
 HARRY L. LINCH,
 THERESA M. SILBER.